E. NASHOLD.
Gridiron.
No. 98,291. Patented Dec. 28, 1869.
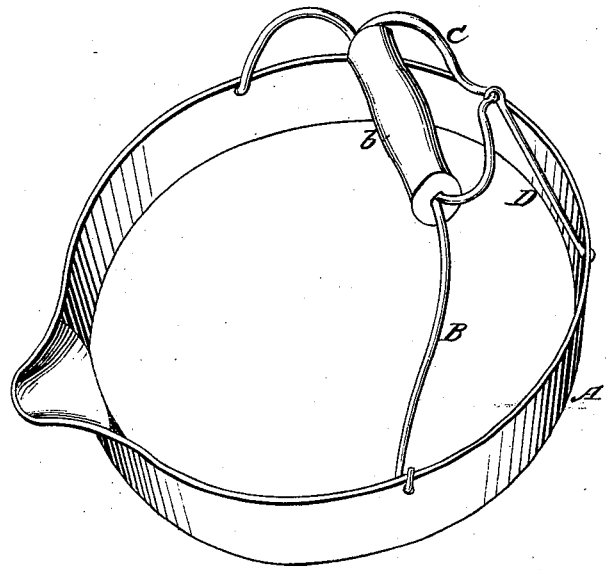
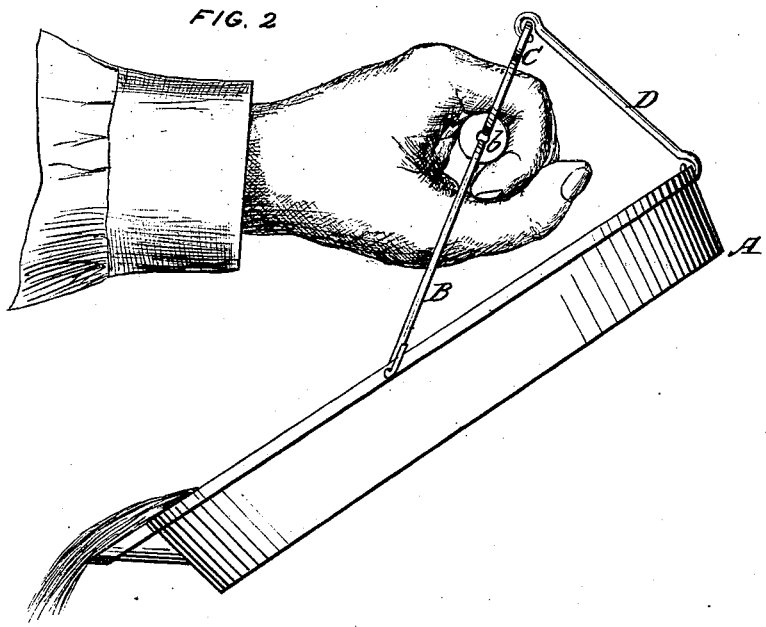
WITNESSES:
Jno F. Fennell
E. H. Clarkson
INVENTOR:
Elias Nashold
by H. W. Beadle

United States Patent Office.

ELIAS NASHOLD, OF ROCKFORD, ILLINOIS.

Letters Patent No. 98,291, dated December 28, 1869.

SPIDER.

The Schedule referred to in these Letters Patent and making part of the same.

To all whom it may concern:

Be it known that I, ELIAS NASHOLD, of Rockford, in the county of Winnebago, and State of Illinois, have invented a new and useful Improvement in Spiders; and I do hereby declare that the following is a full and exact description of the same, reference being had to the accompanying drawings, and to the letters of reference marked thereon.

This invention has for its object the production of an improved kitchen-utensil, commonly known as the spider, which shall be more conveniently handled than the old form, with much less liability of burning the hands; and to that end, It consists in dispensing with the ordinary handle, and in providing the spider, instead, with a bail and suitable brace-rod.

In the drawings—

Figure 1 represents a perspective view, and

Figure 2, a side elevation of my improved spider.

To enable others skilled in the art to make and use my invention, I will now proceed to fully describe its construction and operation.

A represents the spider, which may be constructed in any proper form and of any suitable material.

B represents the bail-rod, constructed in the ordinary manner, and attached to the spider in any desired way. It is provided with the wooden handle $b$, which turns freely thereon as usual.

C represents a bent rod, which is rigidly attached to the handle $b$, as shown.

$c$ represents a U-projection of said rod, to which is attached the upper end of the brace-rod D, as shown, the lower end of which latter is attached to the spider in any proper manner.

The operation is as follows:

The spider may be carried about by the bail, similarly to a bucket or other similar vessel.

When it is desired to empty its contents, the hand is turned in such manner as to elevate the rear end of the rod C, by which means the brace-rod is drawn up, the rear side of the spider elevated, and its contents thus necessarily discharged.

The wooden handle enables the spider to be held without danger of burning the hands, and its location above the spider, prevents it from coming in contact with the person of the cook.

The front of the spider is left entirely open, so that its contents may be readily reached.

In this construction, the long, awkward handle of the old form is dispensed with, and a neat and compact utensil is produced.

Having thus fully described my invention,

What I claim as new, and desire to secure by Letters Patent, is—

The combination of a bail and brace-rod with a spider, as described, for the purpose set forth.

This specification signed and witnessed, this 5th day of November, 1869.

ELIAS NASHOLD.

Witnesses:
G. W. FORD,
CHARLIE S. FORD.